(12) United States Patent
Morgan et al.

(10) Patent No.: US 10,803,454 B2
(45) Date of Patent: Oct. 13, 2020

(54) ATM NETWORK RESOURCE EXCHANGE SYSTEM

(71) Applicant: BANK OF AMERICA CORPORATION, Charlotte, NC (US)

(72) Inventors: Rebecca Stepp Morgan, Charlottesville, VA (US); Shawn Cart Gunsolley, Charlotte, NC (US); Chad Ryan Compton, Valley Park, MO (US); Eric Dryer, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/400,939

(22) Filed: May 1, 2019

(65) Prior Publication Data

US 2020/0134987 A1 Apr. 30, 2020

Related U.S. Application Data

(60) Provisional application No. 62/751,138, filed on Oct. 26, 2018.

(51) Int. Cl.
| | |
|---|---|
| G06Q 20/38 | (2012.01) |
| G06Q 40/02 | (2012.01) |
| G06Q 20/32 | (2012.01) |
| H04L 9/06 | (2006.01) |
| G06Q 20/40 | (2012.01) |
| G06Q 40/04 | (2012.01) |
| G07F 19/00 | (2006.01) |
| H04L 9/32 | (2006.01) |
| G06Q 20/42 | (2012.01) |

(52) U.S. Cl.
CPC ... *G06Q 20/38215* (2013.01); *G06Q 20/3221* (2013.01); *G06Q 20/401* (2013.01); *G06Q 20/42* (2013.01); *G06Q 40/02* (2013.01); *G06Q 40/04* (2013.01); *G07F 19/206* (2013.01); *G07F 19/211* (2013.01); *H04L 9/0637* (2013.01); *H04L 9/3236* (2013.01); *H04L 2209/38* (2013.01); *H04L 2209/56* (2013.01)

(58) Field of Classification Search
CPC ........ G06Q 20/38215; G06Q 20/3221; G06Q 20/401; G06Q 20/42; G06Q 40/02; G07F 19/206
USPC ....................................................... 235/379
See application file for complete search history.

(56) References Cited

U.S. PATENT DOCUMENTS

| | | | |
|---|---|---|---|
| 7,591,413 B1 * | 9/2009 | Block | G07F 19/20 235/379 |
| 7,789,298 B1 * | 9/2010 | Ramachandran | G07F 19/207 235/380 |

(Continued)

*Primary Examiner* — Michael G Lee
*Assistant Examiner* — David Tardif
(74) *Attorney, Agent, or Firm* — Michael A. Springs; Moore & Van Allen PLLC; Jeffrey R. Gray

(57) ABSTRACT

This disclosure illustrates that resource exchange requests may be identified and sent directly to ATMs. The service providers access the ATMs and are able to select the resource exchange request from the ATMs (e.g., electronically, or the like). The service providers transfer the resources at the ATMs, and reconcile the resources at the ATMs. The ATMs may send service provider and/or organization reconciliation notices confirming the reconciliations. In some embodiments, the reconciliation may be stored in a distributed ledger within a blockchain system.

20 Claims, 5 Drawing Sheets

(56) References Cited

U.S. PATENT DOCUMENTS

| | | | |
|---|---|---|---|
| 8,577,804 B1 * | 11/2013 | Bacastow | G06Q 20/102 |
| | | | 705/44 |
| 10,594,991 B1 | 3/2020 | Skolnick | |
| 2002/0105665 A1 | 8/2002 | Wasilewski et al. | |
| 2002/0138365 A1 | 9/2002 | Matsubara | |
| 2005/0080520 A1 | 4/2005 | Kline et al. | |
| 2007/0260466 A1 | 11/2007 | Casella et al. | |
| 2009/0116491 A1 | 5/2009 | Noma | |
| 2010/0332341 A1 | 12/2010 | Rost | |
| 2011/0258128 A1 | 10/2011 | Hambleton et al. | |
| 2013/0124411 A1 * | 5/2013 | Kobres | G07F 19/20 |
| | | | 705/43 |
| 2013/0204783 A1 | 8/2013 | Klose et al. | |
| 2013/0346309 A1 | 12/2013 | Giori | |
| 2014/0214505 A1 | 7/2014 | Shuster-Arechiga et al. | |
| 2016/0247176 A1 | 8/2016 | Dumas et al. | |
| 2017/0118609 A1 | 4/2017 | Rodoni | |
| 2018/0158033 A1 | 6/2018 | Woods et al. | |
| 2019/0158418 A1 | 5/2019 | Way | |
| 2019/0265062 A1 | 8/2019 | Rodoni | |
| 2020/0002090 A1 | 1/2020 | Wolfenden | |

* cited by examiner

ATM NETWORK RESOURCE EXCHANGE SYSTEM

CROSS-REFERENCE TO RELATED APPLICATIONS

This application claims the benefit of U.S. Provisional Patent Application Ser. No. 62/751,138, filed Oct. 26, 2018 entitled "System for Resource Visibility," the entirety of which is incorporated herein by reference.

FIELD

The present disclosure relates to a resource exchange network, and more particularly to a resource exchange network that is utilized to facilitate the exchange of resources at ATMs.

BACKGROUND

Present ATMs do not have the capability to allow communication between the organization, the ATM, and/or the service providers in order to allow resource exchange and reconciliation between the entities. Current systems rely on processes that may result in significant errors in exchanging resources, monitoring the resource exchange, and tracking the resource exchange, as well as present a potential for misappropriation of the resources involved in the resource exchange.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for resource exchange. This disclosure illustrates that resource exchange requests may be identified and sent directly to ATMs. The service providers access the ATMs and are able to select the resource exchange request from the ATMs (e.g., electronically, or the like). The service providers transfer the resources at the ATMs, and reconcile the resources at the ATMs. The ATMs may send the service provider and/or organization reconciliation notices confirming the reconciliations. In some embodiments, the reconciliation may be stored in a distributed ledger within a blockchain system.

Embodiments of the invention comprise system, methods, and computer program products for an automated teller machine (ATM) resource distribution network. The invention comprises receiving a resource exchange request from an organization for a resource exchange at an ATM, wherein the resource exchange request includes one or more resource exchange characteristics. The invention further comprises receiving a selection of the resource exchange request from a service provider, and receiving reconciliation input from the service provider. The invention further comprises sending a service provider reconciliation notification to the service provider, and sending an organization reconciliation notification to the organization.

In further accord with embodiments of the invention the resource exchange request is received from an organization system.

In other embodiments of the invention, the selection of the resource exchange request from the service provider is received through communication with a service provider system.

In yet other embodiments of the invention, the service provider receives a service notification regarding the resource exchange request, wherein the service notification is received by the service provider directly from the organization or through the ATM.

In still other embodiments of the invention the service notification is a pre-scheduled resource distribution request, or an unscheduled resource distribution request.

In other embodiments of the invention, the service notification sent to the service provider includes the one or more resource exchange characteristics.

In further accord with embodiments of the invention, the reconciliation input comprises a resource amount added to the ATM, removed from the ATM, or remaining in the ATM.

In other embodiments of the invention, the reconciliation input is received from a service provider system.

In yet other embodiments of the invention the service provider reconciliation notification comprises service provider resources after reconciliation.

In still other embodiments of the invention, the organization reconciliation notification comprises ATM resources after reconciliation.

In further accord with embodiments of the invention, the resource exchange is reconciled on a distributed ledger by the service provider, the organization, or by the ATM.

In other embodiments, the invention further comprises identifying when the service provider is in range of the ATM, and sending the resource exchange request to a service provider system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
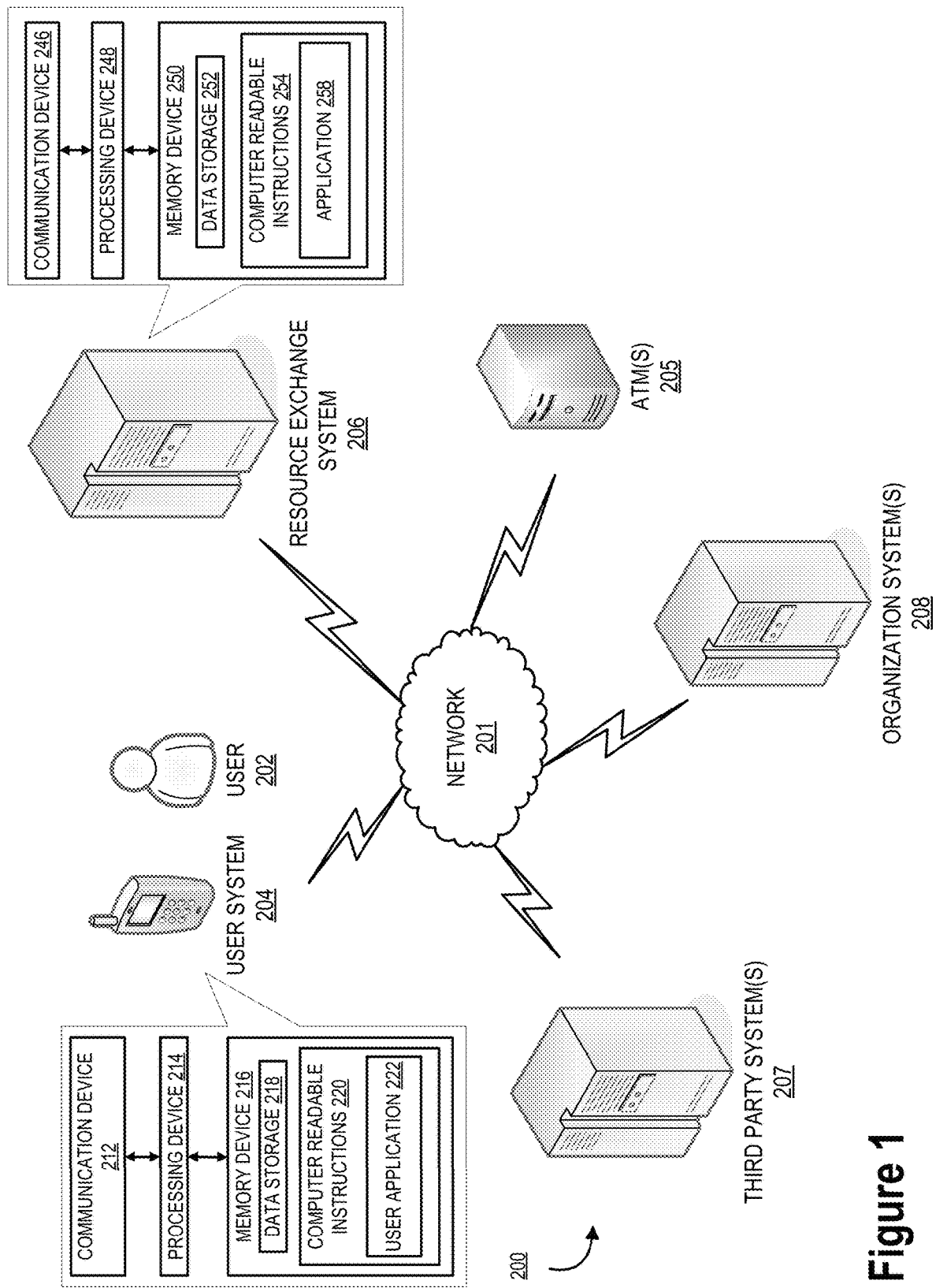

Having thus described embodiments of the invention in general terms, reference will now be made to the accompanying drawings, wherein:

FIG. 1 provides a resource exchange system environment, in accordance with embodiments of the present disclosure.

Figure 2:
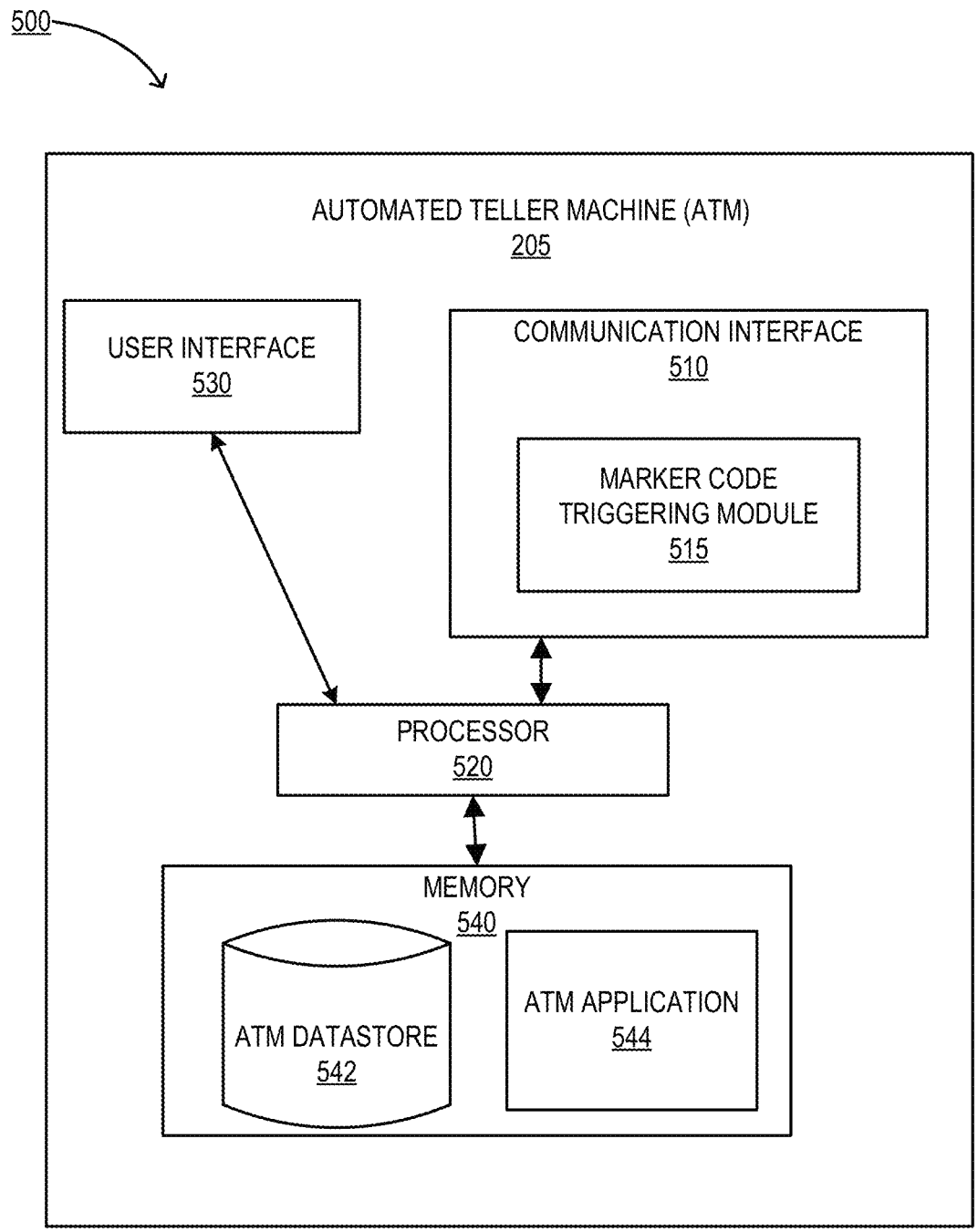

FIG. 2 provides an ATM system environment, in accordance with embodiments of the present disclosure.

Figure 3:
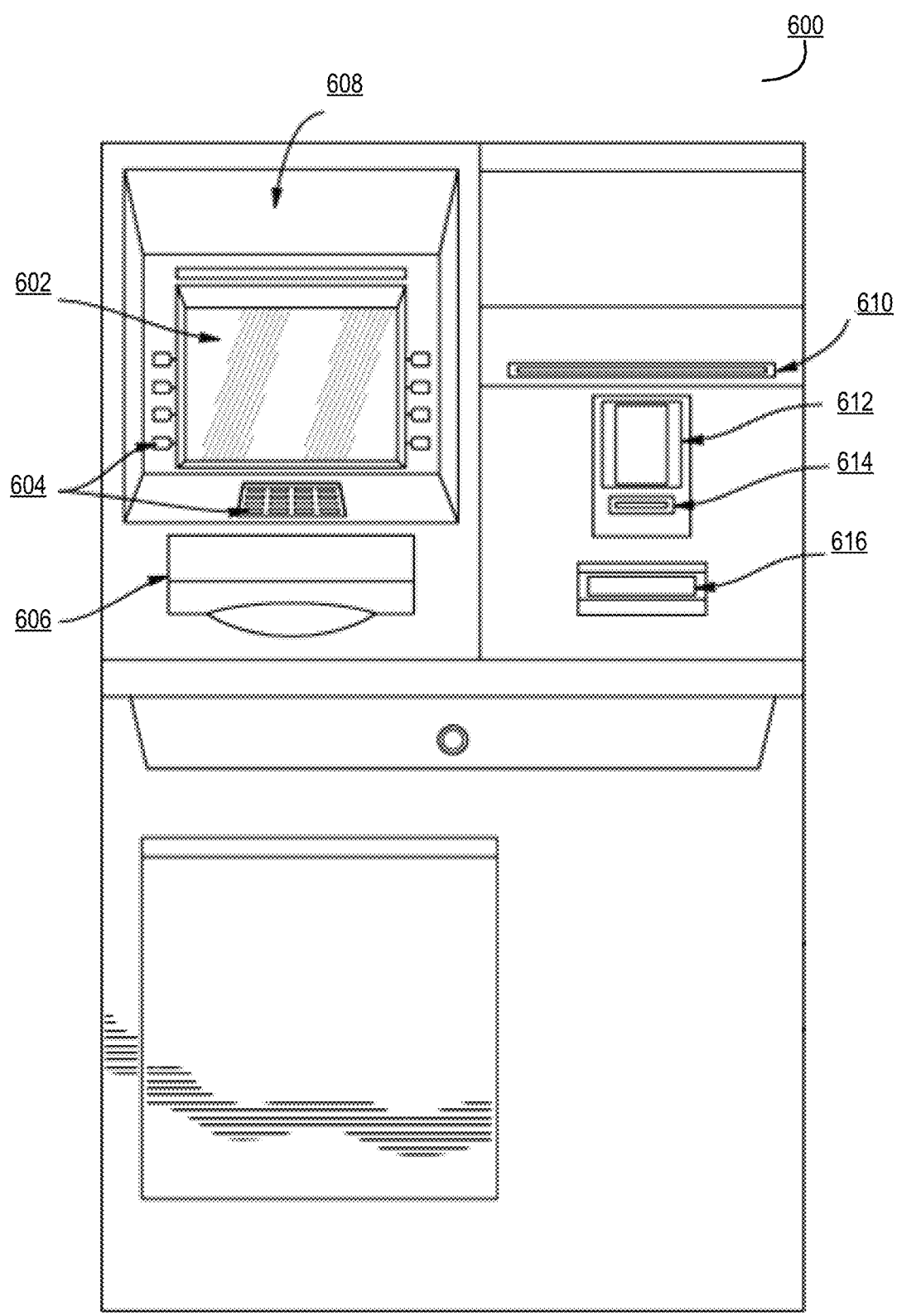

FIG. 3 provides an ATM interface, in accordance with embodiments of the present disclosure.

Figure 4:
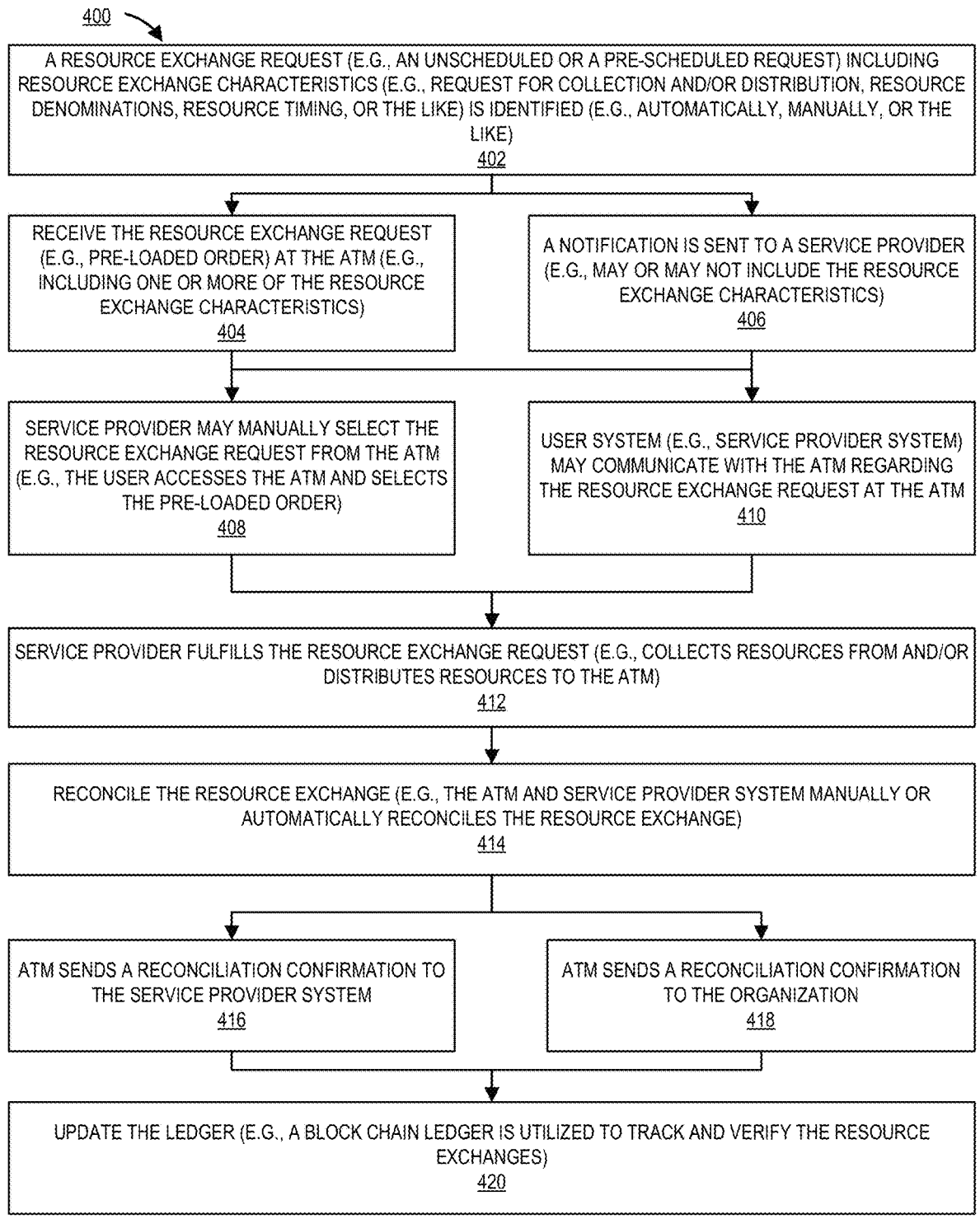

FIG. 4 provides a process flow for resource exchange, in accordance with embodiments of the present disclosure.

Figure 5:
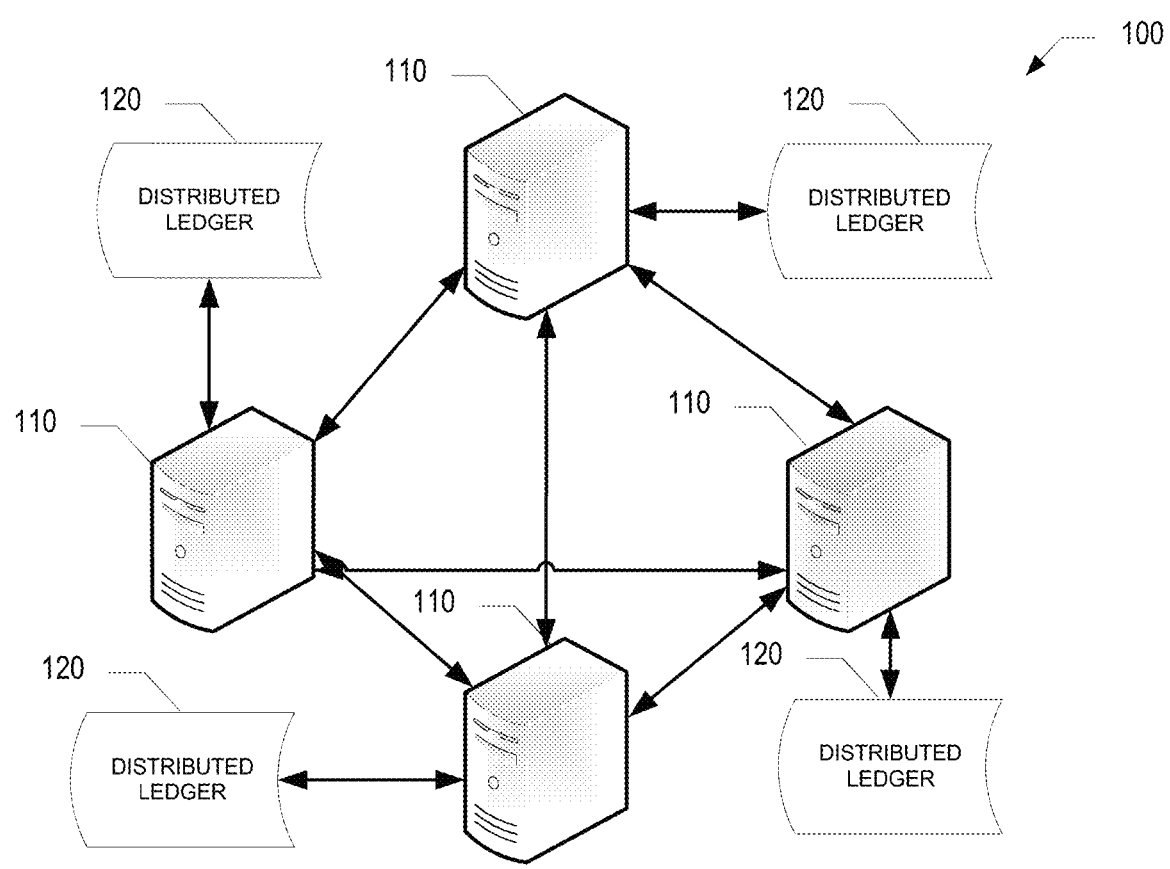

FIG. 5 provides a system environment for implementation of a distributed ledger using blockchain technology, in accordance with embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a resource exchange system environment 200, in accordance with embodiments of the present invention. FIG. 1 provides the system environment 200 illustrating a distributive network with specialized data feeds associated with resource exchanges. FIG. 1 provides a unique system that includes specialized systems (e.g., devices, server(s), or any types of computer system) communicably linked across a resource exchange network in order to perform the functions described herein.

As illustrated in FIG. 1, the one or more organization systems 208 are operatively coupled, via one or more networks 201 to the one or more user systems 204, one or more ATMs 205, one or more third party systems 207, and to the one or more resource exchange systems 206. In this way, the organization systems 208 can send information to and receive information from the user systems 204, ATMs 205, third party systems 207, and/or the resource exchange systems 206. FIG. 1 illustrates only one example of embodiments of the system environment 200, and it will be appreciated that in other embodiments one or more of the systems, or components thereof, may be combined into a single system, or components thereof, or be made up of multiple systems, or components thereof.

The network 201 may be a system specific distributive network receiving and distributing specific network feeds and identifying specific network associated triggers. The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the users 202 may refer to any employee, agent, representative, contractor, or the like of the organization (e.g., financial institution, or the like) or the third-party (e.g., a service provider—such as a carrier, ATM provider or operator, or the like). In some embodiments, the users 202 have user systems 204, such as a mobile device (e.g., mobile phone, smart phone, personal data assistant (PDA), tablet, laptop computer, wearable, or other mobile device such as a device that is operatively coupled to or integrated with a vehicle—such as a car, truck, cycle, or any other type of vehicle), a desktop, computer, or any other type of computing device. The user systems 204 may be a device for business and/or personal use. In some embodiments, identities of a user 202 may include online handles, usernames, aliases, family names, maiden names, nicknames, or the like. The user systems 204 generally comprise one or more communication devices 212, one or more processing devices 214, and one or more memory devices 216. The one or more processing devices 214 are operatively coupled to the one or more communication devices 212 and the one or more memory devices 216. The one or more processing devices 214 use the one or more communication devices 212 to communicate with the network 201 and other systems on the network 201, such as, but not limited to the ATM(s) 205, resource exchange system(s) 206, the organization system(s) 208, and/or the third party system(s) 207. As such, the one or more communication devices 212 generally comprise a modem, server, or other device for communicating with other devices on the network 201. The one or more communication devices 212 may further comprise a display, mouse, keyboard, button, touchpad, touch screen, microphone, speaker, LED, light, joystick, switch, buzzer, bell, and/or other user input/output devices for communicating with one or more users 202.

It should be understood that as used herein, the term one or more processing devices generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The user systems 204 comprise computer-readable instructions 220 and data storage 218 stored in the memory device 216, which in one embodiment includes the computer-readable instructions 220 of one or more user applications 222. In some embodiments, the user application(s) 222 allow a user 202 to send and receive communications with the ATM(s) 205, resource exchange system(s) 206, the third-party system(s) 207, and/or the organization system(s) 208.

As further illustrated in FIG. 1, the resource exchange system(s) 206 generally comprise one or more communication devices 246, one or more processing devices 248, and one or more memory devices 250. The one or more processing devices 248 are operatively coupled to the one or more communication devices 246 and the one or more memory devices 250. The one or more processing devices 248 use the one or more communication devices 246 to communicate with the network 201 and other devices on the network 201, such as, but not limited to the organization system(s) 208, the third party system(s) 207, the ATMs 205, and the user system(s) 204. As such, the one or more communication devices 246 generally comprise a modem, server, or other device for communicating with other devices on the network 201, or other communication devices described herein.

As further illustrated in FIG. 1, the resource exchange system(s) 206 comprise computer-readable instructions 254 stored in the one or more memory devices 250, which in one embodiment includes the computer-readable instructions 254 of a resource exchange application 258. In some embodiments, the one or more memory devices 250 include data storage 252 for storing data related to the system environment 200, such as but not limited to data created and/or used by the resource exchange application 258. In some embodiments of the invention, the resource exchange application 258 may be utilized to facilitate resource exchange and reconciliation between the entities, as will be described herein. In some embodiments, the computer-executable program code of a resource exchange application 258 may also instruct the one or more processing devices 248 to perform certain logic, data processing, and data storing functions. The one or more processing devices 248 are configured to use the communication device 246 to communicate with and ascertain data from the one or more organization systems 208, the one or more third party systems 207, the one or more ATMs 205, and/or the one or more user systems 204.

It should be understood that the resource exchange system(s) 206 may be owned and/or operated by the one or more organizations and/or one or more third-parties (e.g., the ATM providers or operators, vendor carriers, or the like)

As illustrated in FIG. 1, the third party system(s) 207 may be connected to the organization system(s) 208, user system(s) 204, ATMs 205, and/or resource exchange system(s) 206. The third party system(s) 207 have the same or similar components as described above with respect to the user system(s) 204 and the resource exchange system(s) 206. While only one third party system 207 is illustrated in FIG. 1, it is understood that multiple third party systems 207 may make up the system environment 200 (e.g., within a single entity, or through multiple different third party entities). The third party system(s) 207 may include the systems of a service provider (e.g., a carrier that is responsible for collecting from and/or distributing resources to the ATMs), the operator and/or owner of the ATMs (e.g., controls the software of the ATM and/or maintenance of the ATM), or other third party entity. It should be understood that the third party system(s) 207 may include third party applications that interact with the other systems and applications described herein.

As illustrated in FIG. 1, the ATMs 205 are connected to the organization system(s) 208, user system(s) 204, third party system(s) 207, and/or resource exchange system(s) 206. The ATMs 205 have the same or similar components as described above with respect to the user system 204 and the resource exchange system 206. While only one ATM 205 is illustrated in FIG. 1, it is understood that multiple ATMs 205 may make up the system environment 200, which may be owned, operated, and/or serviced by a single entity or by multiple entities. It should be understood that the ATMs 205 may include ATM applications that interact with the other systems and applications described herein.

As illustrated in FIG. 1, the organization system(s) 208 are connected to the third party system(s) 207, the user system(s) 204, ATMs 205, and/or the resource exchange system(s) 206. The organization system(s) 208 may have the same or similar components as described above with respect to the user system(s) 204 and the resource exchange system(s) 206. While only one organization system 208 is illustrated in FIG. 1, it is understood that multiple organization systems 208 may make up the system environment 200 (e.g., multiple systems of a single organization and/or multiple organizations). It should be understood that the organization systems 208 may include one or more organization applications that interact with the other systems and applications described herein. As will be described in further detail herein, the one or more organizations may be financial institutions and/or intermediaries that may be responsible for monitoring resources within ATMs and facilitating the exchanges of resources at such ATMs.

It is understood that the systems described herein illustrate some embodiments of the invention. It is further understood that one or more of the systems (and devices and applications therein) can be combined or split in other embodiments and still function in the same or similar way as the embodiments described herein. As such, the systems, and/or devices (e.g., the processing devices, communication devices, memory devices, datastore devices, and/or the like) described herein may be single systems or devices and/or one or more systems and/or devices.

The resource exchange system environment 200 illustrated in FIG. 1, and described herein, allows for visibility, resource exchange, and resource reconciliation. In some embodiments, the invention may utilize a resource exchange machine such as an ATM (automated teller machine). FIGS. 2 and 3 depict an ATM, however, one of ordinary skill in the art will appreciate that one or more of the devices or systems illustrated are necessary devices for any resource exchange machine.

FIG. 2 illustrates an ATM system environment 500, in accordance with embodiments of the present invention. As illustrated in FIG. 2, the ATMs 205 include one or more communication interfaces 510, one or more processors 520, one or more user interfaces 530, and one or more memory devices 540 having one or more ATM datastores 542 and one or more ATM applications 544 stored therein. As shown, the one or more processors 520 are operatively connected to the one or more communication interfaces 510, the one or more user interfaces 530, and the one or more memory devices 540.

The one or more communication interfaces 510 of the ATM may include a marker code triggering module 515. The marker code triggering module 515 may be configured to authorize a user via contact, contactless, and/or wireless information communication regarding the pin code or marker code inputted by the user. The marker code triggering module 515 may include a transmitter, receiver, smart card, key card, proximity card, radio frequency identification (RFID) tag and/or reader, and/or the like. In some embodiments, the marker code triggering module 515 communicates information via radio, IR, and/or optical transmissions. Generally, the marker code triggering module 515 is configured to operate as a transmitter and/or as a receiver. The marker code triggering module 515 may functions to enable resource exchanges with users 202 using the ATM via identification of the user via physical authentication, contactless authorization, or the like. Also, it will be understood that the marker code triggering module 515 may be embedded, built, carried, and/or otherwise supported in and/or on the ATM 205. In some embodiments, the marker code triggering module 515 is not supported in and/or on the ATM 205, but the marker code triggering module 515 is otherwise operatively connected to the ATM 205 (e.g., where the marker code triggering module 515 is a peripheral device plugged into the ATM 205, or the like).

The one or more communication interfaces 510 may generally also include a modem, server, transceiver, and/or other device for communicating with other devices and systems on a network 201. The one or more user interfaces 530 of the ATMs 205 may include a display (e.g., a liquid crystal display, a touchscreen display, and/or the like) which is operatively coupled to the processor 520. The user interface 530 may include any number of other devices allowing the ATMs 205 to transmit/receive data to/from a user 202, such as a keypad, keyboard, touch-screen, touchpad, microphone, mouse, joystick, other pointer device, button, soft key, and/or other input device(s).

As further illustrated in FIG. 2, the one or more memory devices 540 may include ATM application(s) 544. It will be understood that the ATM applications 544 can be executable to initiate, perform, complete, and/or facilitate one or more portions of any embodiment described and/or contemplated herein. Generally, the ATM applications 544 are executable to receive resource exchange interactions from an organization, third party, and/or users 202, and perform resource exchange functions, as will be described in further detail herein. In some embodiments of the invention, the ATM applications 544 are configured to access content, such as data stored in one or more memory devices, for example, in the one or more ATM datastore 542, or a database in communication with the ATM 205 and may transfer the content to the external apparatus if the external apparatus is configured for ATM communication. Moreover, all or a portion of the ATM applications 544 may be located on another systems described herein.

Of course, the ATM 205 may require users 204 (e.g., service providers) to identify and/or authenticate themselves to the ATM 205 before the ATM 205 will initiate, perform, complete, and/or facilitate a resource exchange interaction. For example, in some embodiments, the ATM 205 is configured (and/or the ATM application 544 is executable) to authenticate a user 202 based at least part on an ATM debit card, smart card, token (e.g., USB token, or the like), username, password, pin, biometric information, and/or one or more other credentials that the user presents to the ATM 205 (or interface thereof). Additionally or alternatively, in some embodiments, the ATM 205 is configured to authenticate a user by using one or multi-factor authentication. For example, in some embodiments, the ATM 205 requires two-factor authentication, such that the user must provide a valid card and enter the correct pin associated with the card in order to authenticate the user to the ATM 205. However, in some embodiments, the user may access the ATM 205 and view or receive content that may be transferred to/from the ATM 205, such as through the user computer systems 204 (e.g., service provider user systems).

FIG. 3 is an interface illustrating an ATM 600, in accordance with embodiments of the present invention. While an ATM is presented in FIG. 3, the device may be any resource exchange machine such as a transaction device, kiosk, terminal, merchant machine, financial institution interface, or the like. FIG. 3 provides a representative illustration of an ATM, in accordance with some embodiments of the present invention. In some embodiments, the ATM 600 comprises a display 602, a keypad 604, a cash receptacle 606, a receipt receptacle 610, a contactless identification sensor 612, and/or a contact identification sensor 614. In some embodiments, the contactless identifier 612 and/or the contact identifier 614 may provide the ATM means of receiving identification from the user 202 (e.g., customer, service provider, or the like). The user 202 may provide contactless or contact identification means through the ATM. The identification means using a contactless or contact identifications may be provided through several mechanisms, including, but not limited to, biometric identification, laser identification, magnetic strip identification, barcode identification, radio frequency (RF), a character recognition device, a magnetic ink, code readers, wireless communication, card scanning, and/or the like. The authentication from the contactless identifier of contact identifier may be read by the ATM application. After the authentication has been read, the system may provide the authentication to the organization to authorize an ATM resource exchange.

In some embodiments, the keypad 604 may provide for identification of the user for use of the ATM. The display 602 provides a means for displaying information related to the resource exchange (e.g., resource exchange request). Display information may be, but is not limited to display of interfaces, such as the start-up interface and an ATM resource exchange interface. In some embodiments, the display 602 is a touch screen display module.

As used herein, an interface (regardless of what system it may be associated with) generally includes a plurality of interface devices and/or software that allow users to input commands and data to direct the processing device to execute instructions. For example, an interface may include a graphical user interface (GUI) or an interface to input computer-executable instructions that direct the processing device to carry out specific functions. Moreover, while the components (e.g., devices) of the ATM described herein, in particular with respect to FIG. 6, are illustrated as being on the front of the ATM, it should be understood that the same or similar components are located on the back of the ATM. Consequently, a service provider user 4 may be able to communicate with, and/or access the resources of, the ATM through the front or back of the ATM.

FIG. 4 illustrates a process flow 400 for the ATM resource exchange network. As illustrated by block 402 in FIG. 4, a resource exchange request is identified for the ATM network. It should be understood that in some embodiments, the organization (e.g., financial institution that is associated with the ATM) determines the resource exchange request. Alternatively, the resource exchange request may be made by a third-party operating on behalf of and/or with the organization. Furthermore, the resource exchange request may be automatically determined by the ATM itself (e.g., or another system monitoring the ATM), when the resources in the ATM reach a threshold (e.g., too low or too high). The resource exchange request may include resource exchange characteristics, which may include, but are not limited to, information related to if the request is for collection and/or distribution of resources, the amount of resources, the denominations related to the resources, the timing of the collection and/or distribution (e.g., the week, day and/or time of day, and/or range thereof), or the like. It should be understood that the resource exchange request may include an unscheduled request (e.g., emergency related, event related, or other like single or multiple visit request) and/or a scheduled request (e.g., user is or will be required to visit the ATM regularly). The resource exchange characteristics may provide the information required for a service provider to make the resource exchange, such as but not limited to, current resources in the ATM (e.g., amounts, denominations, or the like), requested exchange (e.g., resources to be collected from or distributed to the ATM), or the like.

As illustrated by block 404 of FIG. 4, the resource exchange request, including the one or more of the resource exchange characteristics, may be received by the ATM (e.g., transmitted to the ATM over the network 201 by the organization systems 208 and/or the resource exchange systems 206, or the like). In this way, the ATM 205 stores the resource exchange request (e.g., a pre-loaded request for the resource exchange). The pre-loaded resource request may include the instructions for the service provider (e.g., carrier, or the like) when the service provider arrives for the resource exchange at the ATM. It should be understood that the resource exchange request may be sent to the ATM at any time before a scheduled and/or unscheduled service of the ATM. As such, in some embodiments the resource exchange request is sent to the ATM in advance of a scheduled service so that the service provider will have instructions when the service provider arrives.

As illustrated in block 406 of FIG. 4, in some embodiments, a notification may be sent to the service provider when the resource exchange request is sent to the ATM. The notification may be an alert that the ATM requires a resource exchange, and the service provider will review the resource exchange request when the service provider arrives at the ATM. Alternatively, the notification may include sending the full, and/or partial, resource exchange request to the service provider so that the service provider will have at least some of the resource exchange characteristics before arriving at the ATM. For example, in this way the service provider will have an idea of the resource amount to be collected (e.g., an estimation thereof) or an idea of the resource amount to be distributed (e.g., an estimation thereof) to the ATM (e.g., the resource amount and/or denominations thereof). Depending on when the resource request is received at the ATM and/or when the notification is received by the service provider, the resource amount within the ATM may change (e.g., resources will continue to be added and/or removed from the ATM before the service is performed).

When the service provider arrives at the ATM to service the ATM, the service provider may identify the resource exchange request. For example, as illustrated in block 408 of FIG. 2, the service provider may access one or more user interfaces of the ATM and identify and/or select the resource exchange request from a user interface on the ATM. In this way, the user has the instructions for the resource exchange based on the user resource exchange requests. Alternatively, as illustrated by block 410, instead of manually selecting the resource exchange request, the user system 204 (e.g., a mobile device of the service provider) may communicate with the ATM in order to identify the resource exchange request stored at the ATM. For example, the ATM 205 may communicate with the user systems 204 in order to electronically send the resource exchange request from the ATM to the user systems 204 to allow the user to view resource exchange request and complete the resource exchange. In some embodiments, the ATM 205 may identify when a service provider user system 204 is in range with the ATM 205. For example, when the service provider user system 204 is within a particular distance (e.g., within inches, feet, yards, or the like), when the service provider user system 204 accesses an application and/or the ATM 205 through the service provider user system 204, or the like, the ATM 205 may identify the service provider user system 204. It should be further understood that in some embodiments the resource exchange request may include authentication information related to the particular service provider (e.g., specific user and/or third-party) that is authorized to access the resource exchange request, and thus, may only communicate the resource exchange request and/or allow access to the ATM 205 after the service provider has been authenticated to access the ATM 205. It should be understood that by providing a resource change request electronically to the ATMs, the resource exchange request may be updated at any time before the service provider reaches the ATM. That is, should an event occur that requires the collection and/or distribution of more or less resources, the resource exchange request may be electronically updated.

Block 412 of FIG. 4 illustrates that the service provider fulfills the resource exchange request. For example, in response to the resource exchange request, the service provider collects the resources from the ATM and/or distributes the resources subject to the resource exchange request. In some embodiments of the invention, the ATMs 205 may be able to read the amount of resources being removed from and/or added to the ATMs and/or a carriage thereof. For example, the resources (e.g., paper money) may be scanned using optical character recognition, wireless identification (e.g., from information embedded within the money, or the like), or identification using another like resource identifier. However, it should be understood that since the resource exchange request was automatically received, such as by the ATM and/or the user system 204 of the service provider, then the service provider is not required to manually enter (e.g., key in) any resource amounts and/or other resource characteristics. Under typical processing, a service provider enters the resource amounts and/or other resource characteristics (e.g., denominations, or the like) being collected from and/or distributed to the ATM 205. This manual keying could result in errors in reconciling the ATMs 205. It should be understood that there may be hundreds of thousands, millions, or the like ATM services in a given year. The keying process may result in a large number of errors that cause reconciliation issues, resource loses, and/or the opportunity for the misappropriation of resources (e.g., errors that make it easier for resources to be taken at the ATM, during transit, and/or at third-party locations—vaults, or the like).

FIG. 4 further illustrates in block 414 that the service provider user systems 204 reconcile the resource exchange at the ATM 205. For example, the user may indicate on the user system 204 and/or on an interface on the ATM 205, that the resource exchange is completed. It should be understood that the service provider is not required to enter specific resource amount, just indicate that the physical resource exchange matches the resource exchange request. Thereafter, the ATM 205 and/or a resource exchange system 206 may automatically reconcile the ATM 205, the service provider systems 207, and/or the organization systems 208. That is, the one or more systems may identify the resource amounts remaining in the ATM, the resource amounts collected from the ATM, and/or the resource amounts distributed to the ATM. In some embodiments, should the ATM include scanning devices for both outgoing and incoming distributions (e.g., collections and/or distributions made by the service provider), the ATM may have an accounting of the residual resources within the ATM, the resources collected by the service provider, and/or the resources deposited by the service provider. In some embodiments of the invention, the reconciliation may be automatically determined as the service provider collects the resources from and/or distributes the resources to the ATM. It should be understood that should any errors have occurred at the ATM regarding the resources in the ATM 205, the resources ordered by the organization as requested in the resource exchange request, the resources shipped by the service provider and delivered by the service provider to the ATM 205, and/or any errors the service provider collected from and/or distributed to the ATM 205, the service provider is in the best position to correct any such errors at the ATM 205, or later on when returning resources to the vault. As such, the reconciliation of the resource exchange may occur at the ATM and/or later on after any errors in the resources collected from and/or distributed to the ATM 205 are identified.

In some embodiments of the invention, the ATM 205 sends the reconciliation confirmation to the service provider systems (e.g., the user systems 204 and/or the third-party systems 207), as illustrated by block 416 of FIG. 4. That is, in some embodiments, the electronic reconciliation sent to the service provider system allows the service provider to more accurately monitor and/or track the resources that the service provider collected from and/or distributed to the ATM 205 in order to identify any potential misappropriation of any resources.

Block 418 of FIG. 4 further illustrates that in some embodiments the ATM 205 and/or the resource exchange system 206, may also send a reconciliation confirmation to the organization systems 208. As such, the organization may be able to track the resources collected from and/or distributed to the ATM 205 more accurately.

FIG. 4 further illustrates in block 420 that upon completion of the resource exchange, the resource exchange may be updated in a ledger. For example, a block chain ledger may be utilized to capture the resource exchanges in order to more accurately capture, monitor, and/or store the resource exchange for viewing by multiple parties. It should be understood that utilizing a block chain ledger in the present disclosure will provide a more accurate record of resource collections and/or distributions in order to more easily identify any misappropriation of resources.

By electronically making the resource exchange requests, and electronically reconciling the resource exchanges, it should be understood that the resource exchange processes may be more efficient and accurate. That is, no manual keying is required, adjustments to the requests are not required as often (e.g., requests can be automatically electronically updated by the ATM or resource exchange system), and tracking of the resources can be done in real-time (e.g., real-time or near real time) to better identify where errors in the resource collection and/or distribution may have occurred. The electronic resource exchange request not only makes it easier to monitor and track the resource exchanges, but also eliminates the need for any paper receipts of any of the resource exchanges at the ATM. Paper receipts are typically used by the service provider in order to try to track and/or monitor the resource exchanges for reconciliation purposes. However, using paper is time consuming, expensive, and potentially error prone based on quality issues with the paper, ink, and/or damage to the receipts, which makes it harder to read the paper receipts (e.g., optical scanning of reconciliation receipts is error prone). The electronic resource exchange requests and subsequent reconciliation eliminates the issues with the paper receipts.

FIG. 5 provides a block chain system diagram, illustrating how a block chain operates, and how the ledger of the present invention may be implemented in some embodiments of the invention. As such, instead of utilizing a centralized database to access, view, store, disseminate, and/or validate information related to the resource exchanges between the organization, the ATMs, the service providers, or the like, the present invention may utilize a decentralized block chain configuration or architecture, as shown in FIG. 5, in order to allow users to access, view, store, disseminate, and/or validate information, or take another action related to the resource exchanges. Such a decentralized block chain configuration ensures accurate mapping and validation of resource exchange characteristics, and provides a secured network over which the resource exchange characteristics may be validated. Accordingly, block chain configurations may be utilized with respect to any type of information, such as, but not limited to maintaining an accurate ledger of information, such as the resource exchange characteristic information described herein.

A block chain (otherwise described herein as a "blockchain") is a distributed database that maintains a list of data records, the security of which is enhanced by the distributed nature of the block chain. A block chain typically includes several nodes, which may be one or more entities, systems within an entity, machines, computers, databases, data stores, or the like operably connected with one another. For example, the various systems described with respect to FIG. 1, or devices within the systems described with respect to FIG. 1 may be nodes. In some aspects of the invention, an entity may be a node of a block chain, and internal or external users 4 may access the entity systems in order to take actions with respect to an event. In other aspects of the invention various systems within an entity may be nodes, which may or may not be grouped together and associated with the entity. In other aspects of the invention, each of the nodes or multiple nodes are maintained by different entities, or components within an entity, and as such different systems within an entity or between entities may act as nodes. A block chain typically works without a central repository or single administrator, however, in the present invention a network of nodes within a single entity or group of entities may together serve as a central repository or single administrator that can control access to the block chain that is associated with a plurality of different nodes.

A block chain provides numerous advantages over traditional databases. For example, with respect to utilizing a block chain for resource exchanges, a large number of nodes of a block chain may reach a consensus regarding the validity of a resource exchange contained on a decentralized resource exchange ledger. Similarly, when multiple versions of a document or resource transfer exits on the ledger, multiple nodes can converge on the most up-to-date version of the resource transfer. For example, in the case of a resource exchange, any node within the block chain that stores or validates the resource exchange, can determine within a level of certainty whether the resource exchange can take place and become final by confirming that no conflicting resource exchanges (e.g., the same resource amount, time, location, or the like) are confirmed by the block chain elsewhere on other nodes.

The block chain typically has two primary types of records. The first type is the event type (e.g., resource exchange type, document type, or the like), which consists of the actual data stored in the block chain. The second type is the block type, which are records that confirm when and in what sequence certain events (e.g., resource exchanges, or the like) became recorded as part of the block chain. Events (e.g., resource exchanges, or the like) are created by the users 202 using the block chain in its normal course of business, for example, when one organization exchanges resources with another organization), blocks are created by users known as "miners" who use specialized software/equipment to create the blocks for the event. Users of the block chain create blocks for the events (e.g., resource transfers, or the like), which are passed around to various nodes of the block chain. A "valid" resource transfer is one that can be validated based on a set of rules that are defined by the particular system implementing the block chain. For example, in the case of a resource exchange, a valid resource exchange is one that may be digitally signed by the organizations, sent from a valid digital system, and in some cases, meets other criteria (e.g., certain security features are met, authorization credentials of users, or the like). In some block chain systems, miners create blocks because of a reward structure that offers a pre-defined per-block reward and/or payments offered within the resource exchanges validated themselves. Thus, when a miner successfully validates a resource exchange on the block chain, the miner may receive rewards and/or payments as a reason to continue creating new blocks.

As mentioned above and referring to FIG. 5, a block chain 100 is typically decentralized—meaning that a distributed ledger 120 (i.e., a decentralized ledger) is maintained on multiple nodes 110 of the block chain 100. One node in the block chain may have a complete or partial copy of the entire ledger or set of events (e.g., resource exchanges, or the like) and/or blocks on the block chain. Events (e.g., resource exchanges, or the like) are initiated at a node of a block chain and communicated to the various other nodes of the block chain. Any of the nodes, or users of the nodes, which have access to the block chain to validate an event, add the event to its copy of the block chain, and/or broadcast the event (e.g., resource exchange, or the like) its validation (in the form of a block) and/or other data to other nodes. This other data may include time-stamping of the resource exchange.

In various aspects, the block chain may be configured with a set of rules (otherwise described herein as "limits") to dictate what actions may be taken by users and/or nodes for various events, how information may be accessed, created, stored, disseminated, and/or validated, and/or how the network communicates information throughout the one or more block chains across the nodes of various entities associated with the nodes (e.g., supports the nodes on the entity systems). In some aspects, the rules dictate that an originating node (i.e., a node through which a resource transfer was initiated) must approve all actions for events mapped to that node. In some aspects, the rules dictate that some or all actions for events may be approved by one or more validator nodes without further input from the originating node. In some such cases, the rules dictate that additional information is needed in determining whether an action for an event should be approved. In other aspects, the validating node must reach out to the originating node in certain situations as dictated by the rules. For example, if the action for the event, such as validating a resource exchange, is in any way, indicated to be a faulty or invalid (due to some information present on the block chain, such as successive resource exchanges not corresponding—that is AMT exchanges don't match what a service provider brings back to a vault), then the rules may dictate that the validating node communicate with the originating node to confirm or deny validation of the event.

In some aspects, the validator may approve the event (e.g., resource exchange, or the like) without communicating with the originating node. In such a case, the validator (or a group or all of validators if multiple or universal validations, respectively, are required by the rules), can approve the action for the event based solely on the information contained in the block chain. Thus, if an action for an event is requested and a validator receives the action for the event, it can check the actions for the event against its ledger to determine whether an originating node has validated the event. If so, then the validator may approve the action for the event. In this regard, the action for the event may be approved very quickly, and in some cases, in real-time or near real-time.

In various aspects, any of the nodes 110 illustrated in FIG. 5, may be a validator or a miner that validates events (e.g., resource transfers, or the like). In some aspects, a number of the nodes 110 must validate an event (e.g., resource transfer, or the like) in order for the event to be approved. For example, in one embodiment, two or three nodes 110 must validate the authenticity of the event, or portions thereof, before the event may be approved. As noted above, in some instances, the rules of the block chain and/or rules specific to particular originating entities or validators dictate that validators cannot approve events without confirming available information (e.g., amount of the resource exchange or other resource exchange characteristics). In some cases, the available information is already associated with an alias on the public block chain, or associated with an organization within an entity controlling a private block chain, but in other cases, the validator on the block chain must communicate with the originating entity in order to request approval of the event (e.g., resource transfer, or the like).

In some aspects, the rules may only be changed by the originating node (maintained by an originating entity or entities that control the block chain) to ensure the validity of a change to a rule. In some cases, particularly in cases where one or more nodes have raised a concern that an event is not valid, the originating node may be contacted for verification of the event.

In various aspects, the event, or information for the event, is stored and executed from one or more systems and is not placed on the public block chain itself, and instead is located on a private portion of the block chain. In some aspects, the event, or information for the event, is only stored and executed from a subset of the nodes of the block chain, which, in some aspects, are synonymous with validator nodes and in other aspects are not synonymous with the validator nodes. In some aspects, placeholder(s) for the event (e.g., resource transfers, or the like) indicating that the event exists and/or a description of the event, is accessible from private block chains and may be placed on the public block chain. The placeholder(s) may be identifiers (e.g., characters, or the like) and/or a description of the event. In some cases, the event may be executed only by the designated one or more systems (e.g., on the private block chain, or on a private portion of a block chain). Such systems may utilize a key or other security mechanism(s) in order to ensure only certain nodes are allowed access to the information related to the private block chain portion. In some cases, this configuration may result in additional security instead of placing the event on the public block chain for any node to execute.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with resource exchange.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for an automated teller machine (ATM) resource distribution network for servicing ATMs, the system comprising:
    one or more memory components having computer readable code stored thereon; and
    one or more processing components operatively coupled to the one or more memory components, wherein the one or more processing components are configured to execute the computer readable code to:
        receive a resource exchange request from an organization for a resource exchange at an ATM, wherein the resource exchange request includes one or more resource exchange characteristics, wherein the one or more resource exchange characteristics comprise at least a resource collection from the ATM or a resource distribution to the ATM and a timing for the resource collection or the resource distribution, and wherein the organization is a financial institution or third-party acting on behalf of the financial institution that is responsible for the ATM;
        send a service notification to a service provider for the resource exchange request, wherein the service notification comprises the one or more resource exchange characteristics;
        receive a selection of the resource exchange request from the service provider, wherein the selection is received through the ATM or a service provider system;
        receive an indication from a user acting on behalf of the service provider that the resource collection or the resource distribution has been completed
        receive reconciliation input from the service provider, wherein the reconciliation input comprises a resource amount collected from the ATM, distributed to the ATM, or remaining in the ATM;
        send a service provider reconciliation notification to the service provider; and
        send an organization reconciliation notification to the organization.

2. The system of claim 1, wherein the resource exchange request is received from an organization system.

3. The system of claim 1, wherein the selection of the resource exchange request from the service provider is received through communication with the service provider system.

4. The system of claim 1, wherein the service notification is received by the service provider directly from the organization or through the ATM.

5. The system of claim 1, wherein the service notification is a pre-scheduled resource distribution request.

6. The system of claim 1, wherein the service notification is an unscheduled resource distribution request.

7. The system of claim 1, wherein the reconciliation input is received from the service provider system.

8. The system of claim 1, wherein the service provider reconciliation notification comprises service provider resources after reconciliation.

9. The system of claim 1, wherein the organization reconciliation notification comprises ATM resources after reconciliation.

10. The system of claim 1, wherein the resource exchange is reconciled on a distributed ledger by the service provider, the organization, or by the ATM.

11. The system of claim 1, wherein the one or more processing components are configured to execute the computer readable code to:
identify when the service provider is in range of the ATM; and
send the resource exchange request to the service provider system.

12. A computer implemented method for an automated teller machine (ATM) resource distribution network for servicing ATMs, the method comprising:
receiving, by one or more processing devices, a resource exchange request from an organization for a resource exchange at an ATM, wherein the resource exchange request includes one or more resource exchange characteristics, wherein the one or more resource exchange characteristics comprise at least a resource collection from the ATM or a resource distribution to the ATM and a timing for the resource collection or the resource distribution, and wherein the organization is a financial institution or third-party acting on behalf of the financial institution that is responsible for the ATM;
sending, by the one or more processing devices, a service notification to a service provider for the resource exchange request, wherein the service notification comprises the one or more resource exchange characteristics;
receiving, by the one or more processing devices, a selection of the resource exchange request from the service provider, wherein the selection is received through the ATM or a service provider system;
receiving, by the one or more processing devices, an indication from a user acting on behalf of the service provider that the resource collection or the resource distribution has been completed
receiving, by the one or more processing devices, reconciliation input from the service provider, wherein the reconciliation input comprises a resource amount collected from the ATM, distributed to the ATM, or remaining in the ATM;
sending, by the one or more processing devices, a service provider reconciliation notification to the service provider; and
sending, by the one or more processing devices, an organization reconciliation notification to the organization.

13. The method of claim 12, wherein the selection of the resource exchange request from the service provider is received through communication with the service provider system.

14. The method of claim 12, wherein the service notification is received by the service provider directly from the organization or through the ATM.

15. The method of claim 12, wherein the service notification is a pre-scheduled resource distribution request or an unscheduled resource distribution request.

16. The method of claim 12, wherein the resource exchange is reconciled on a distributed ledger by the service provider, the organization, or by the ATM.

17. A computer program product for an automated teller machine (ATM) resource distribution network, the computer program product comprising at least one non-transitory computer-readable medium having computer-readable program code portions embodied therein, the computer-readable program code portions comprising:
an executable portion configured to receive a resource exchange request from an organization for a resource exchange at an ATM, wherein the resource exchange request includes one or more resource exchange characteristics, wherein the one or more resource exchange characteristics comprise at least a resource collection from the ATM or a resource distribution to the ATM and a timing for the resource collection or the resource distribution, and wherein the organization is a financial institution or third-party acting on behalf of the financial institution that is responsible for the ATM;
an executable portion configured to send a service notification to a service provider for the resource exchange request, wherein the service notification comprises the one or more resource exchange characteristics;
an executable portion configured to receive a selection of the resource exchange request from the service provider wherein the selection is received through the ATM or a service provider system;
an executable portion configured to receive an indication from a user acting on behalf of the service provider that the resource collection or the resource distribution has been completed;
an executable portion configured to receive reconciliation input from the service provider, wherein the reconciliation input comprises a resource amount collected from the ATM, distributed to the ATM, or remaining in the ATM;
an executable portion configured to send a service provider reconciliation notification to the service provider; and
an executable portion configured to send an organization reconciliation notification to the organization.

18. The computer program product of claim 17, wherein the selection of the resource exchange request from the service provider is received through communication with the service provider system.

19. The computer program product of claim 17, wherein the service notification is received by the service provider directly from the organization or through the ATM.

20. The computer program product of claim 17, wherein the service notification is a pre-scheduled resource distribution request or an unscheduled resource distribution request.

* * * * *